(12) United States Patent
Laakso, Jr. et al.

(10) Patent No.: US 7,964,110 B2
(45) Date of Patent: Jun. 21, 2011

(54) CURE SYSTEM FOR HALOGENATED ELASTOMER COMPOSITIONS, A CURABLE HALOGENATED ELASTOMER COMPOSITION, AND A METHOD FOR CURING HALOGENATED ELASTOMER COMPOSITIONS

(75) Inventors: Raymond L. Laakso, Jr., St Francisville, LA (US); Gary R. Marchand, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 336 days.

(21) Appl. No.: 12/438,981

(22) PCT Filed: Aug. 21, 2007

(86) PCT No.: PCT/US2007/076396
§ 371 (c)(1),
(2), (4) Date: Feb. 26, 2009

(87) PCT Pub. No.: WO2008/027757
PCT Pub. Date: Mar. 6, 2008

(65) Prior Publication Data
US 2009/0326143 A1    Dec. 31, 2009

Related U.S. Application Data

(60) Provisional application No. 60/841,115, filed on Aug. 30, 2006.

(51) Int. Cl.
| C08K 5/37 | (2006.01) |
|---|---|
| C08K 5/34 | (2006.01) |
| C08K 3/22 | (2006.01) |
| C08K 5/17 | (2006.01) |
| C08K 5/092 | (2006.01) |
| C08J 3/24 | (2006.01) |

(52) U.S. Cl. ......... 252/182.17; 252/182.13; 252/182.14; 252/182.23; 252/182.28; 252/182.32; 252/183.13; 525/330.7; 525/334.1; 525/343; 525/346; 525/347; 525/349; 525/350; 525/351; 525/366; 525/374; 525/375

(58) Field of Classification Search ............... 525/330.7, 525/334.1, 343, 346, 347, 349, 350, 351, 525/366, 374, 375; 252/182.13, 182.14, 252/182.17, 182.23, 182.28, 182.32, 183.13
See application file for complete search history.

(56) References Cited

U.S. PATENT DOCUMENTS

| 3,454,544 | A |   | 7/1969 | Young et al. |
|---|---|---|---|---|
| 4,128,510 | A |   | 12/1978 | Richwine |
| 4,234,705 | A |   | 11/1980 | Matoba |
| 4,288,576 | A |   | 9/1981 | Richwine |
| 4,342,851 | A |   | 8/1982 | Suzui et al. |
| 4,357,446 | A |   | 11/1982 | Matoba |
| 4,434,274 | A |   | 2/1984 | Jablonski |
| 4,482,681 | A | * | 11/1984 | Berta et al. ............... 525/349 |
| 4,551,505 | A |   | 11/1985 | Sauerbier et al. |
| 4,591,617 | A |   | 5/1986 | Berta |
| 4,591,621 | A |   | 5/1986 | Ennis |
| 4,745,147 | A |   | 5/1988 | Honsberg |
| 4,767,823 | A |   | 8/1988 | Jones et al. |
| 5,272,236 | A |   | 12/1993 | Lai et al. |
| 5,278,272 | A |   | 1/1994 | Lai et al. |
| 5,665,830 | A |   | 9/1997 | Class |
| 5,686,537 | A |   | 11/1997 | Class |

FOREIGN PATENT DOCUMENTS
WO    WO-2006/069191    6/2006

OTHER PUBLICATIONS

International Search Report PCT/US2007/076396, Jan. 2008.

* cited by examiner

*Primary Examiner* — Roberto Rabago

(57) ABSTRACT

The instant invention is a cure system for halogenated elastomer compositions, a curable halogenated elastomer composition, and a method for curing a halogenated elastomer composition. The cure system for halogenated elastomer compositions includes a polymercapto crosslinking agent, an inorganic base, and a hydrated salt selected from the group consisting of lithium citrate, trilithium citrate pentahydrate, trilithium citrate tetrahydrate, and monolithium dihydrogen citrate monohydrate. The curable halogenated elastomer composition includes a chlorinated elastomer, and a cure system including a polymercapto crosslinking agent, an inorganic base, and a hydrated salt selected from the group consisting of lithium citrate, trilithium citrate pentahydrate, trilithium citrate tetrahydrate, and monolithium dihydrogen citrate monohydrate. Furthermore, the method for curing a halogenated elastomer composition includes the following steps: (1) providing a chlorinated elastomer composition; (2) providing a cure system composition including a polymercapto crosslinking agent, an inorganic base, and a hydrated salt selected from the group consisting of lithium citrate, trilithium citrate pentahydrate, trilithium citrate tetrahydrate, and monolithium dihydrogen citrate monohydrate; (3) uniformly blending the cure system into the chlorinated elastomer composition; (4) thereby forming a curable chlorinated elastomer composition; (5) subjecting the curable chlorinated elastomer composition to heat or heat and pressure; and (6) thereby curing the curable chlorinated elastomer composition.

16 Claims, No Drawings

CURE SYSTEM FOR HALOGENATED ELASTOMER COMPOSITIONS, A CURABLE HALOGENATED ELASTOMER COMPOSITION, AND A METHOD FOR CURING HALOGENATED ELASTOMER COMPOSITIONS

CROSS-REFERENCE TO RELATED APPLICATIONS

This application is claiming priority from the U.S. Provisional Patent Application No. 60/841,115 filed on Aug. 30, 2006 entitled "A CURE SYSTEM FOR HALOGENATED ELASTOMER COMPOSITIONS, A CURABLE HALOGENATED ELASTOMER COMPOSITION, AND A METHOD FOR CURING HALOGENATED ELASTOMER COMPOSITIONS" the teachings of which are herein as if reproduced in full hereinbelow.

FIELD OF INVENTION

The instant invention relates to a cure system for halogenated elastomer compositions, a curable halogenated elastomer composition, and a method for curing halogenated elastomer compositions.

BACKGROUND OF THE INVENTION

Chlorinated elastomers, such as chlorinated polyethylene, may be cured via various means including the use of peroxide/coagent systems, thiadiazole-based systems, or irradiation crosslinking techniques. Peroxide cures are typically preferred for their scorch safety, shelf-life or bin stability, low permanent set, and high temperature performance. However, peroxide cure systems are often unacceptable for use in molded goods because of mold sticking, and fouling due to volatiles or in applications that require a low temperature cure due to equipment or processing limitations.

Thiadiazole-based cure systems provide certain advantages such as the ability to cure over a wider range of temperature and pressure conditions than peroxide cures while generating fewer volatile byproducts, having good mold release characteristics, and the ability to use less expensive compounding ingredients such as aromatic oils.

U.S. Pat. No. 4,128,510 discloses vulcanizing halogen-containing polymers. The halogen-containing polymers can be crosslinked by heating with certain derivatives of 2,5-dimercapto-1,3,4-thiadiazole, such as the monobenzoate derivative, and a basic material to produce useful vulcanizates of increased strength and insolubility in organic solvents. Concentrates of the derivatives of 2,5-dimercapto-1,3,4-thiadiazole are prepared by incorporating the thiadiazole in a binder material such as a polymer, wax, rosin, etc. for subsequent compounding with the halogen-containing polymer to be crosslinked.

U.S. Pat. No. 4,288,576 discloses 2,5-Dimercapto-1,3,4-thiadiazole as a cross-linker for saturated, halogen-containing polymers. The saturated, halogen-containing polymers are cross-linked to yield stable vulcanizates with good aging, compression set resistance, and insolubility in organic solvents using 2,5-dimercapto-1,3,4-thiadiazole, or a concentrate thereof in a binder material, in the presence of certain basic materials in normal vulcanization procedures.

U.S. Pat. No. 4,482,681 discloses crosslinking halogen-containing polymers. Halogen-containing polymers are crosslinked by heat-curing with a crosslinking system made up of a crosslinking agent, which is either a polymercaptan or an ester derivative thereof, a basic material and a hydrated salt.

U.S. Pat. No. 4,551,505 discloses a process for crosslinking chlorinated polyethylene. The crosslinking of chlorinated polyethylene with 2,5-dimercapto-1,3,4-thiadiazole in the presence of a basic substance is carried out to improve vulcanizate properties.

U.S. Pat. No. 4,745,147 discloses a vulcanizable chlorinated polyethylene composition. The composition includes chlorinated polyethylene containing from 20 to 50 weight percent chlorine, from 0.75 to 3 parts per 100 parts by weight chlorinated polyethylene of a polymercapto compound such as 2,5-dimercapto-1,3,4-thiadiazole, from 0.5 to 20 parts by weight per 100 parts by weight chlorinated polyethylene of an acid acceptor such as magnesium oxide, from 0.25 to 10 parts by weight per 100 parts chlorinated polyethylene of a polyhydric alcohol. Preferably, the composition contains an initiator, which is an amine, quaternary ammonium compound, or a phosphonium compound.

U.S. Pat. No. 5,655,830 discloses a process for controlling premature curing of vulcanizable halogen-containing polymers. The process includes blending before storage, into the vulcanizable composition, a thioester derivative of 2,5-dimercapto-1,3,4-thiadiazole crosslinking agent and polyethylene glycol, whereby the scorch time of the vulcanizable compound is not significantly affected by the water content of the composition.

U.S. Pat. No. 5,686,537 discloses a process for controlling premature curing of vulcanizable halogen-containing polymers.

U.S. Pat. No. 4,591,617 discloses crosslinking compositions for butyl rubber or halobutyl rubber, and epihalohydrin rubber blends. The crosslinking compositions include both sulfur and non-sulfur curative systems, which are particularly adapted for crosslinking rubber blends of (a) from 35 percent to 85 percent halobutyl rubber or a mixture of butyl rubber and halobutyl rubber wherein the halobutyl rubber is at least 50 percent by weight of the mixture, and (b) from 15 percent to 65 percent of an epihalohydrin rubber, and to the rubber materials crosslinked therewith.

U.S. Pat. No. 4,357,446 discloses a curable composition of halogen-containing polymer. The curable composition of a halogen-containing polymer is composed of (1) 100 parts by weight of a halogen-containing polymer, (2) as a crosslinking agent, from 0.1 to 10 parts by weight of a 2,3-dimercaptopyrazine or -quinoxaline compound having a certain formula, and (3) as an acid acceptor, from 0.5 to 50 parts by weight of a compound of a metal.

U.S. Pat. No. 4,434,274 discloses vulcanizable compositions of halogen and carboxyl containing acrylate elastomers, 2,5-dimercapto-1,3,4-thiadiazole, a Group IVA metal oxide or salt, and a tetraalkyl thiuram sulfide. Dual cure site acrylate elastomers containing both active halogen and carboxyl groups are compounded with a combination of 2,5-dimercapto-1,3,4-thiadiazole, a Group IVA metal oxide or salt thereof, and a tetraalkyl thiuram sulfide to provide compounds having an excellent scorch/cure rate balance, and balance of desirable physical properties in the vulcanizates thereof.

Despite the research efforts in developing and improving the cure rate of chlorinated polyethylenes while maintaining stability at storage temperatures thereof, there is still a need for further improvement in cure rate of chlorinated polyethylenes while maintaining stability at storage and processing temperatures.

SUMMARY OF THE INVENTION

The instant invention is a cure system for halogenated elastomer compositions, a curable halogenated elastomer composition, and a method for curing a halogenated elastomer composition. The cure system for halogenated elastomer compositions includes a polymercapto crosslinking agent, an inorganic base, and a hydrated salt selected from the group consisting of lithium citrate, trilithium citrate pentahydrate, trilithium citrate tetrahydrate, and monolithium dihydrogen citrate monohydrate. The curable halogenated elastomer composition includes a chlorinated elastomer, and a cure system including a polymercapto crosslinking agent, an inorganic base, and a hydrated salt selected from the group consisting of lithium citrate, trilithium citrate pentahydrate, trilithium citrate tetrahydrate, and monolithium dihydrogen citrate monohydrate. Furthermore, the method for curing a halogenated elastomer composition includes the following steps: (1) providing a chlorinated elastomer composition; (2) providing a cure system composition including a polymercapto crosslinking agent, an inorganic base, and a hydrated salt selected from the group consisting of lithium citrate, trilithium citrate pentahydrate, trilithium citrate tetrahydrate, and monolithium dihydrogen citrate monohydrate; (3) uniformly blending the cure system into the chlorinated elastomer composition; (4) thereby forming a curable chlorinated elastomer composition; (5) subjecting the curable chlorinated elastomer composition to heat or heat and pressure; and (6) thereby curing the curable chlorinated elastomer composition.

DETAILED DESCRIPTION OF THE INVENTION

The instant invention is a cure system for halogenated elastomer compositions, a curable halogenated elastomer composition, and a method for curing a halogenated elastomer composition.

The cure system for halogenated elastomer compositions includes a polymercapto crosslinking agent, an inorganic base, and a hydrated salt. The cure system may further include a first vulcanization accelerator, a second vulcanization accelerator, a chelating agent, or combination of at least two of them.

Polymercapto crosslinking agents, as used herein, refers to crosslinking agents, which contain at least two —SH groups. These crosslinking agents may sometimes be referred to as curing agents or vulcanizing agents. Polymercapto crosslinking agents include, but are not limited to, 2,5-dimercapto-1,3,4-thiadiazole, and its derivatives, as described in U.S. Pat. No. 4,128,510; 1,3,5-triazine-2,4,6-trithiol and its derivatives; dimercaptotriazoles, as described in U.S. Pat. No. 4,234,705; 2-4-dithiohydantoins, as described in U.S. Pat. No. 4,342,851; and 2,3-dimercapto-pyrazine or -quinoxalines, as described in U.S. Pat. No. 4,357,446. The polymercapto crosslinking agent may, for example, be 2-mercapto-1,3,4-thiadiazole-5-thiobenzoate. The cure system may include any amounts of polymercapto crosslinking agent; for example, the cure system may include from about 0.5 to 5 parts of polymercapto crosslinking agent per 100 parts of the halogenated elastomer composition to be cured. All individual values and subranges from 0.5 to 5 parts of polymercapto crosslinking agent per 100 parts of the halogenated elastomer composition to be cured are included herein and disclosed herein. For example, the cure system may include from 1 to 3 parts of polymercapto crosslinking agent per 100 parts of the halogenated elastomer composition to be cured.

Inorganic bases include, but are not limited to, metal oxides, metal hydroxides, or their salts with weak acids. The base acts as an acid acceptor to capture the hydrochloric acid that is formed as a byproduct of the curing reaction. Typical metals include, but are not limited to, those of Group IIA of the Periodic Table, such as Mg, Ca, or Ba. Specific examples of these compounds include, but are not limited to, magnesium oxide, magnesium hydroxide, calcium oxide, calcium hydroxide, barium hydroxide, magnesium carbonate, calcium carbonate, and barium carbonate. The basic metal oxides and hydroxides may preferably be magnesium oxide and magnesium hydroxide. The cure system may include any amounts of inorganic base; for example, the cure system may include from 1 to 20 parts of inorganic base per 100 parts of the halogenated elastomer composition to be cured. All individual values and subranges from 1 to 20 parts of inorganic base per 100 parts of the halogenated elastomer composition to be cured are included herein and disclosed herein. For example, the cure system may include from 3 to 10 parts of inorganic base per 100 parts of the halogenated elastomer composition to be cured.

Hydrated salts include, but are not limited to, lithium citrate, trilithium citrate pentahydrate, trilithium citrate tetrahydrate, and monolithium dihydrogen citrate monohydrate. The cure system may include any amounts of hydrated salt; for example, the cure system may include from 0.5 to 10 parts of hydrated salt per 100 parts of the halogenated elastomer composition to be cured. All individual values and subranges from 0.5 to 10 parts of hydrated salt per 100 parts of the halogenated elastomer composition to be cured are included herein and disclosed herein. For example, the cure system may include from about 1 to 5 parts of hydrated salt per 100 parts of the halogenated elastomer composition to be cured.

First vulcanization accelerator may be any accelerator; for example, first vulcanization accelerator may be a quaternary ammonium salt, a quaternary phosphonium salt, an aromatic heterocyclic quaternary ammonium salt, a tertiary amine, or a dihydropyridine derivative. The first vulcanization accelerator may preferably be a quaternary ammonium salt or a quaternary phosphonium. The quaternary ammonium salts and quaternary phosphonium salts may have the general formula selected from the group consisting of

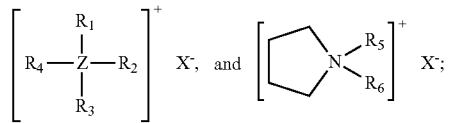

wherein Z is either a nitrogen atom or a phosphorous atom, each of $R_{1-4}$ is independently an alkyl or aryl group containing between 2 and 8 carbon atoms and wherein the total number of carbon atoms on $R_{1-4}$ is between 10 and 14 carbons, $R_5$ and $R_6$ are alkyl groups containing between 1 and 8 carbon atoms and the total number of carbon atoms on $R_5$-$R_6$ is between 5 and 9. Aryl groups may, for example, be benzyl or phenyl. The anion, $X^-$, of the onium salt may include, but is not limited to, chloride, bromide, hydrogen sulfate, acetate, fluoride, dihydrogen phosphate, and other anions which form stable quaternary ammonium or phosphonium salts. Aromatic heterocyclic quaternary ammonium and phosphonium salts wherein the nitrogen or phosphorous atom is part of the ring are not considered accelerators for use in the compositions of the instant invention. Exemplary quaternary ammonium compounds include, but are not limited to, tetrapropylammonium bromide, and triethylhexylammonium bromide.

The cure system may include any amounts of the first vulcanization accelerator; for example, the cure system may include from about 0.1 to 1.0 parts of the first vulcanization accelerator per 100 parts of the halogenated elastomer composition to be cured. All individual values and subranges from 0.1 to 1.0 parts of the first vulcanization accelerator per 100 parts of the halogenated elastomer composition to be cured are included herein and disclosed herein. For example, the cure system may include from about 0.1 to 0.75 parts of the first vulcanization accelerator per 100 parts of the halogenated elastomer composition to be cured; or in the alternative, the cure system may include from about 0.1 to 0.3 parts of the first vulcanization accelerator per 100 parts of the halogenated elastomer composition to be cured.

Second vulcanization accelerator may be any accelerator; for example, second vulcanization accelerator may be a quaternary ammonium salt, a quaternary phosphonium salt, an aromatic heterocyclic quaternary ammonium salt, a tertiary amine, or a dihydropyridine derivative. The second vulcanization accelerator may preferably be an aromatic heterocyclic quaternary ammonium salt. The aromatic heterocyclic quaternary ammonium salts may have the general formula selected from the group consisting of

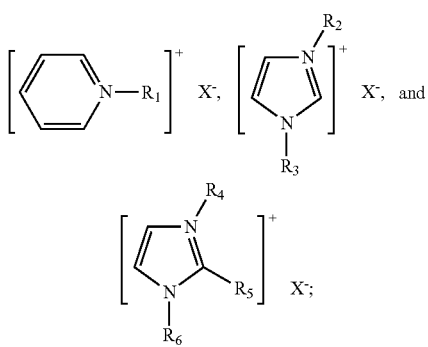

wherein $R_1$ is an alkyl or aryl group containing between 4 and 12 carbon atoms; $R_2$ and $R_3$ are independently alkyl or aryl groups containing between 1 and 8 carbon atoms, and wherein the total number of carbon atoms on $R_2$ and $R_3$ is between 3 and 9; $R_4$, $R_5$ are methyl groups; $R_6$ is an alkyl group containing between 2 and 8 carbon atoms; and wherein X is an anion. $R_2$ may, for example, be a methyl group. Aryl groups may, for example, be benzyl or phenyl. The anion, $X^-$, of the quaternary ammonium salt may include, but is not limited to, chloride, bromide, hydrogen sulfate, acetate, fluoride, dihydrogen phosphate, and other anions, which form stable quaternary ammonium or phosphonium salts. The exemplary aromatic heterocyclic quaternary ammonium salts include, but are not limited to, 1-octylpyridinium chloride, 1-octylpyridinium bromide, 1-butyl-3-methylimidazolinium chloride, 1-hexyl-3-methylimidazolinium chloride, and 1-hexyl-2,3-dimethylimidazolinium chloride. The cure system may include any amounts of the second vulcanization accelerator; for example, the cure system may include from about 0.1 to 1.0 parts of the second vulcanization accelerator per 100 parts of the halogenated elastomer composition to be cured. All individual values and subranges from 0.1 to 1.0 parts of the second vulcanization accelerator per 100 parts of the halogenated elastomer composition to be cured are included herein and disclosed herein. For example, the cure system may include from about 0.1 to 0.75 parts of the second vulcanization accelerator per 100 parts of the halogenated elastomer composition to be cured; or in the alternative, the cure system may include from about 0.1 to 0.3 parts of the second vulcanization accelerator per 100 parts of the halogenated elastomer composition to be cured.

The chelating agent may, for example, be a nitrogen containing chelating compound. Nitrogen containing chelating compounds include, but are not limited to, bidentate nitrogen compounds, tridentate nitrogen compounds, tetradendate nitrogen compounds, and polydentate nitrogen compounds. Each chelating compound contains two or more nitrogen atoms that are oriented in a configuration capable of forming a coordination complex in association with a charged or polarizable metal atom or other charged or polarizable moiety. Such compounds do not contain only two nitrogen atoms at para positions, relative to one another, on one or more aromatic rings. The cure system may include any amounts of the chelating agent; for example, the cure system may include from 0.2 to 2 parts of the chelating agent per 100 parts of the halogenated elastomer composition to be cured. All individual values and subranges from 0.2 to 2 parts of chelating agent per 100 parts of the halogenated elastomer composition to be cured are included herein and disclosed herein. For example, the cure system may include from about 0.5 to 1.5 parts of chelating agent per 100 parts of the halogenated elastomer composition to be cured.

Bidentate nitrogen compounds include, but are not limited to, ethylenediamine, 2,2'-bipyridine, 1,10-phenanthroline, and derivatives thereof. Such derivatives, as the term is used herein, are compounds based on the structure of the respective parent compound. Representative structures are shown below.

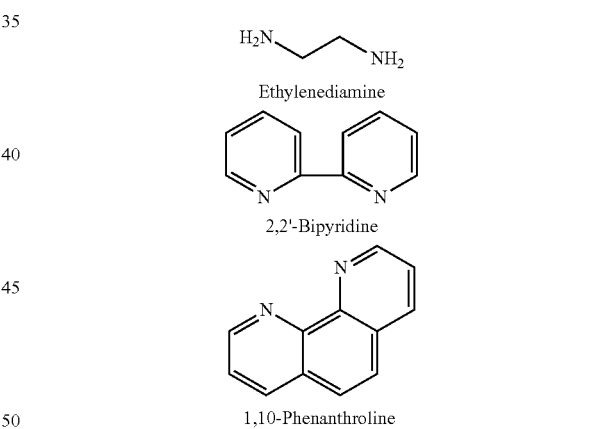

Tridentate nitrogen containing compounds include, but are not limited to, a terpyridine, diethylenetriamine, and derivatives thereof. Representative structures are shown below.

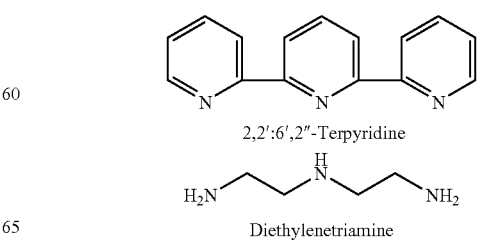

Tetradentate nitrogen containing compounds include, but are not limited to, triethylenetetramine, porphyrin, phthalocyanine, and derivatives thereof. Representative structures are shown below.

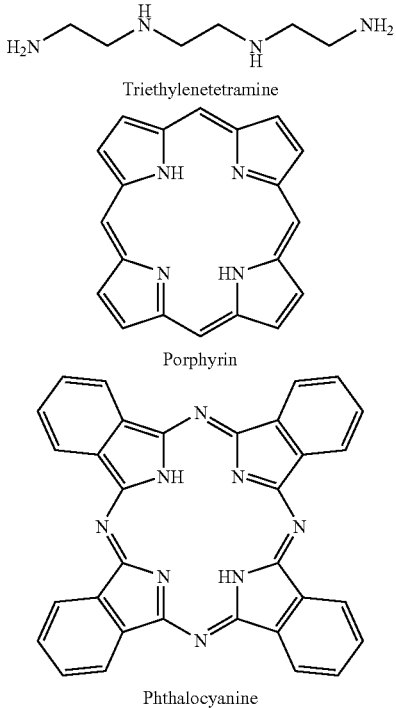

Triethylenetetramine

Porphyrin

Phthalocyanine

Polydentate nitrogen containing compounds include, but are not limited to, aziridine homopolymers (or polyethyleneimines), aziridine/1,2-diaminoethane copolymers, polymeric condensation product of ammonia and 1,2-dichloroethane, or derivatives thereof. Representative polyethyleneimines (PEIs) are polymeric amines with the general backbone unit, —(CH$_2$—CH$_2$—NH)$_n$—, where "n" is from 10 to $10^5$. Polyethyleneimines may also include branched and/or spherical polyamines. In general, these structures usually have a well-defined ratio of primary, secondary, and tertiary amine functions. An example of a portion of a representative polyethyleneimine is shown below.

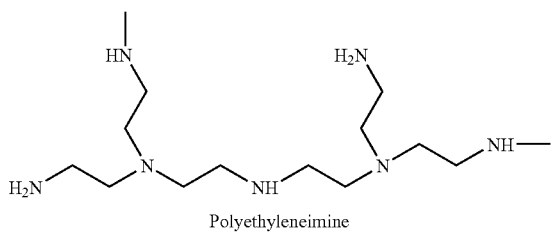

Polyethyleneimine

In one embodiment, the nitrogen containing chelating compounds preferably do not contain any heteroatoms, other than nitrogen and oxygen, and more preferably contain only hydrogen, carbon, and nitrogen. In another embodiment, the nitrogen containing chelating compound contains an N—C—C—N bonding sequence in the structure of the compound. In a further embodiment, the N—C—C—N bonding sequence is selected from the structures shown below:

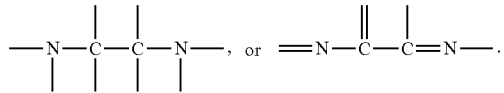

The nitrogen containing chelating compound must be soluble or finely dispersible in the polymer phase of the compound in order to be an effective component of the invention. Furthermore, it is preferable that the nitrogen containing chelating agent have a boiling point that exceeds the temperature at which the elastomer compound is cured, so that occupational exposure to the chelating agent and bubble formation in the finished elastomer product are minimized.

Some nitrogen containing chelating compounds, such as ethylenediamine-tetraacetic acid (EDTA) and it salts, are not soluble or dispersible in many elastomer compounds, and therefore are not effective. Nitrogen containing chelating agents may preferably be 1,10-phenanthroline and its derivatives.

The curable halogenated elastomer composition includes a chlorinated elastomer, and a cure system including a polymercapto crosslinking agent, an inorganic base, and a hydrated salt. The cure system may further include a first vulcanization accelerator, a second vulcanization accelerator, a chelating agent, or combination of at least two of them.

Chlorinated elastomer may be any chlorinated polymer or copolymer. Any polymer or copolymer containing halogen atoms that can be compounded to form an elastomeric product after crosslinking can be considered a halogenated elastomer for the purposes of this invention. Examples of halogenated elastomers include, but are not limited to, polychloroprene, polyepichlorohydrin, epichlorohydrin/ethylene oxide copolymers, chlorosulfonated polyethylene, chlorinated butyl rubber, chlorinated ethylene alpha-olefin copolymers, copolymers of vinylidene fluoride and hexafluoropropylene, brominated butyl rubbers, and chlorinated polyethylene. Furthermore, any polymer or copolymer containing chlorine atoms that can be compounded to form an elastomeric product after crosslinking can be considered a chlorinated elastomer for the purposes of this invention.

The chlorinated elastomer may be amorphous or semi-crystalline. The chlorinated elastomer may, for example, be chlorinated polyethylene homopolymer or chlorinated polyethylene copolymer. The chlorinated olefin elastomer may have any melt index (I$_{10}$) value. For example, the chlorinated olefin elastomer may have a melt index (I$_{10}$) value in the range of about 0.05 to 200 dg/minute. All individual values and subranges from 0.05 to 200 dg/minute are included herein and disclosed herein. For example, the polyolefin base resins may have a melt index (I$_{10}$) value in the range of about 0.05 to 110 dg/minute; or in the alternative, the polyolefin base resins may have a melt index (I$_{10}$) value in the range of about 0.05 dg/minute to 0.8. I$_{10}$ melt indices within the range of 0.05-0.8 dg/minute correspond generally to weight average molecular weights of 400,000-1,000,000 daltons.

The chlorinated elastomer may, for example, be selected from the group consisting of a) chlorinated polyethylene homopolymers prepared from polyethylenes having an I$_{10}$ value of from 0.05-0.8 dg/minute and b) chlorinated ethylene copolymers prepared from ethylene copolymers having an I$_{10}$ value of from 0.05-0.8 dg/minute that comprise copolymerized units of i) ethylene and ii) up to 25 weight percent (based on the total weight of monomers) of a copolymerizable monomer.

Representative chlorinated ethylene copolymers include, but are not limited to, those prepared from copolymers comprising ethylene and at least one ethylenically unsaturated monomer selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids. Chlorinated graft copolymers are included as well.

Specific examples of suitable chlorinated ethylene copolymers include, but are not limited to, chlorinated ethylene vinyl acetate copolymers; chlorinated ethylene acrylic acid copolymers; chlorinated ethylene methacrylic acid copolymers; chlorinated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; and chlorinated copolymers of ethylene with propylene, butene, 3-methyl-1-pentene, or octene. The copolymers may be dipolymers, terpolymers, or higher order copolymers.

The chlorinated olefin elastomer may contain 15-48 percent by weight of chlorine based on the total weight of the chlorinated olefin elastomer, preferably 25 to 38 percent by weight of chlorine based on the total weight of the chlorinated olefin elastomer.

The chlorinated olefin elastomers may be prepared from polyolefin resins that are branched or unbranched. The polyolefin base resins may be prepared via any method, for example, by free radical processes, Ziegler-Natta catalysis or catalysis with metallocene catalyst systems, as disclosed in U.S. Pat. Nos. 5,272,236 and 5,278,272. Chlorination of the base resins may take place in suspension, solution, solid state or fluidized bed. Free radical suspension chlorination processes are described and taught in U.S. Pat. No. 3,454,544, U.S. Pat. No. 4,767,823 and references cited therein. Such processes involve preparation of an aqueous suspension of a finely divided ethylene polymer, which is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823.

The curable compositions of this invention may, optionally, further comprise one or more other polymers blended with the chlorinated olefin elastomer. Examples of such other polymers include, but are not limited to, ethylene/alpha olefin elastomers, EPDM, chlorosulfonated polyethylene, polychloroprene, ethylene vinyl acetate and chlorinated polyethylene resin. When such polymers are present in the curable composition, their total amount is generally in the range of 1 to 50 (preferably 5 to 25) parts by weight per 100 parts by weight of chlorinated olefin elastomer. For the purposes of this invention, such polymers are not considered to be part of the additive package as defined hereinafter.

The curable chlorinated elastomer may contain any amounts of an additive package; for example, the curable chlorinated elastomer may contain at least 1 part by weight of an additive package per 100 parts by weight of the chlorinated olefin elastomer. All individual values and subranges of at least 1 part by weight of an additive package per 100 parts by weight of the chlorinated olefin elastomer are included herein and disclosed herein. For example, the curable chlorinated elastomer may contain at least 150 part by weight of an additive package per 100 parts by weight of the chlorinated olefin elastomer, or in the alternative, the curable chlorinated elastomer may contain at least 300 part by weight of an additive package per 100 parts by weight of the chlorinated olefin elastomer. The latter units are often referred to as "parts per 100 parts rubber" or "phr" in the art. Typically, more than one type of additive will be included in the additive package.

Examples of additives suitable for use in the compositions of this invention include, but are not limited to, fillers, plasticizers, process aids, acid acceptors, antioxidants, antiozonants, and pigments. The term "additive" as used herein specifically excludes polymers such as other elastomers, crystalline thermoplastic polyolefin resins and crystalline chlorinated thermoplastic polyolefin resins, which may be present in the compositions of this invention. Thus, the level of such polymers is not included in the level of the additive package.

Examples of suitable fillers include, but are not limited to, carbon black, talc, silica, clays, calcium carbonate, titanium dioxide, and colorants. The additive package may contain from 1 to 120 parts by weight of carbon black per 100 parts by weight of the chlorinated olefin elastomer. All individual values and subranges from 1 to 120 parts by weight of carbon black per 100 parts by weight of the chlorinated olefin elastomer are included herein and disclosed herein. For example, the additive package may contain from 20 to 120 parts by weight of carbon black per 100 parts by weight of the chlorinated olefin elastomer. The additive package may contain from 1 to 150 parts by weight of talc per 100 parts by weight of the chlorinated olefin elastomer. All individual values and subranges from 1 to 150 parts by weight of talc per 100 parts by weight of the chlorinated olefin elastomer are included herein and disclosed herein. For example, the additive package may contain from 20 to 150 parts by weight of talc per 100 parts by weight of the chlorinated olefin elastomer. The additive package may contain from 1 to 300 parts by weight of calcium carbonate per 100 parts by weight of the chlorinated olefin elastomer. All individual values and subranges from 1 to 300 parts by weight of calcium carbonate per 100 parts by weight of the chlorinated olefin elastomer are included herein and disclosed herein. For example, the additive package may contain from 50 to 300 parts by weight of calcium carbonate per 100 parts by weight of the chlorinated olefin elastomer. The additive package may contain from 1 to 20 parts by weight of titanium dioxide per 100 parts by weight of the chlorinated olefin elastomer. All individual values and subranges from 1 to 20 parts by weight of titanium dioxide per 100 parts by weight of the chlorinated olefin elastomer are included herein and disclosed herein. For example, the additive package may contain from 5 to 20 parts by weight of titanium dioxide per 100 parts by weight of the chlorinated olefin elastomer. The additive package may contain from 1 to 10 parts by weight of colorants per 100 parts by weight of the chlorinated olefin elastomer. All individual values and subranges from 1 to 10 parts by weight of colorants per 100 parts by weight of the chlorinated olefin elastomer are included herein and disclosed herein. For example, the additive package may contain from 5 to 10 parts by weight of colorants per 100 parts by weight of the chlorinated olefin elastomer.

Examples of plasticizers include, but are not limited to, dioctyl phthalate (DOP), diisononyl phthalate (DINP), dioctyl adipate (DOA), trioctyltrimellitate (TOTM), dioctyl sebacate (DOS), diundecyl phthalate (DUP), certain polymeric esters such as Paraplex® series (available from C.P. Hall), and chlorinated paraffins. The additive package may contain from 1 to 100 parts by weight of plasticizers per 100 parts by weight of the chlorinated olefin elastomer. All individual values and subranges from 1 to 100 parts by weight of plasticizers per 100 parts by weight of the chlorinated olefin elastomer are included herein and disclosed herein. For example, the additive package may contain from 20 to 100 parts by weight of plasticizers per 100 parts by weight of the chlorinated olefin elastomer; or in the alternative, the additive package may contain from 30 to 60 parts by weight of plasticizers per 100 parts by weight of the chlorinated olefin elastomer.

Examples of processing aids include, but are not limited to, lubricants such as paraffin wax, oxidized polyethylene wax and Struktol® WB212 (Struktol Company of America). The additive package may contain from 1 to 8 parts by weight of processing aids per 100 parts by weight of the chlorinated olefin elastomer. All individual values and subranges from 1 to 8 parts by weight of processing aids per 100 parts by weight of the chlorinated olefin elastomer are included herein and disclosed herein. For example, the additive package may contain from 1 to 8 parts by weight of processing aids per 100 parts by weight of the chlorinated olefin elastomer; or in the alternative, the additive package may contain from 1 to 4 parts by weight of processing aids per 100 parts by weight of the chlorinated olefin elastomer.

Examples of acid acceptors include, but are not limited to, organic amines, epoxidized resins, metal oxides and metal hydroxides. The additive package may contain from 1 to 8 parts by weight of acid acceptors per 100 parts by weight of the chlorinated olefin elastomer. All individual values and subranges from 1 to 8 parts by weight of acid acceptors per 100 parts by weight of the chlorinated olefin elastomer are included herein and disclosed herein. For example, the additive package may contain from 1 to 6 parts by weight of acid acceptors per 100 parts by weight of the chlorinated olefin elastomer; or in the alternative, the additive package may contain from 2 to 6 parts by weight of acid acceptors per 100 parts by weight of the chlorinated olefin elastomer.

Many different commercially available antioxidants and antiozonants may be employed in the compositions of the invention. The additive package may contain from 0.1 to 3 parts by the weight of antioxidants and antiozonants per 100 parts by weight of the chlorinated olefin elastomer. All individual values and subranges from 0.1 to 3 parts by weight of antioxidants and antiozonants per 100 parts by weight of the chlorinated olefin elastomer are included herein and disclosed herein. For example, the additive package may contain from 0.2 to 3 parts by weight of antioxidants and antiozonants per 100 parts by weight of the chlorinated olefin elastomer.

Polymercapto crosslinking agents, as described hereinabove, refers to crosslinking agents, which contain at least two —SH groups. These crosslinking agents may sometimes be referred to as curing agents or vulcanizing agents. Polymercapto crosslinking agents include, but are not limited to, 2,5-dimercapto-1,3,4-thiadiazole, and its derivatives, as described in U.S. Pat. No. 4,128,510; 1,3,5-triazine-2,4,6-trithiol and its derivatives; dimercaptotriazoles, as described in U.S. Pat. No. 4,234,705; 2-4-dithiohydantoins, as described in U.S. Pat. No. 4,342,851; and 2,3-dimercaptopyrazine or -quinoxalines, as described in U.S. Pat. No. 4,357,446. The polymercapto crosslinking agent may, for example, be 2-mercapto-1,3,4-thiadiazole-5-thiobenzoate. The cure system may include any amounts of polymercapto crosslinking agent; for example, the cure system may include from about 0.5 to 5 parts of polymercapto crosslinking agent per 100 parts of the halogenated elastomer composition to be cured. All individual values and subranges from 0.5 to 5 parts of polymercapto crosslinking agent per 100 parts of the halogenated elastomer composition to be cured are included herein and disclosed herein. For example, the cure system may include from 1 to 3 parts of polymercapto crosslinking agent per 100 parts of the halogenated elastomer composition to be cured.

Inorganic bases include, but are not limited to, metal oxides, metal hydroxides, or their salts with weak acids. The base acts as an acid acceptor to capture the hydrochloric acid that is formed as a byproduct of the curing reaction. Typical metals include, but are not limited to, those of Group IIA of the Periodic Table, such as Mg, Ca, or Ba. Specific examples of these compounds include, but are not limited to, magnesium oxide, magnesium hydroxide, calcium oxide, calcium hydroxide, barium hydroxide, magnesium carbonate, calcium carbonate, and barium carbonate. The basic metal oxides and hydroxides may preferably be magnesium oxide and magnesium hydroxide. The cure system may include any amounts of inorganic base; for example, the cure system may include from 1 to 20 parts of inorganic base per 100 parts of the halogenated elastomer composition to be cured. All individual values and subranges from 1 to 20 parts of inorganic base per 100 parts of the halogenated elastomer composition to be cured are included herein and disclosed herein. For example, the cure system may include from 3 to 10 parts of inorganic base per 100 parts of the halogenated elastomer composition to be cured.

Hydrated salts include, but are not limited to, lithium citrate, trilithium citrate pentahydrate, trilithium citrate tetrahydrate, and monolithium dihydrogen citrate monohydrate. The cure system may include any amounts of hydrated salt; for example, the cure system may include from 0.5 to 10 parts of hydrated salt per 100 parts of the halogenated elastomer composition to be cured. All individual values and subranges from 0.5 to 10 parts of hydrated salt per 100 parts of the halogenated elastomer composition to be cured are included herein and disclosed herein. For example, the cure system may include from about 1 to 5 parts of hydrated salt per 100 parts of the halogenated elastomer composition to be cured.

First vulcanization accelerator may be any accelerator; for example, first vulcanization accelerator may be a quaternary ammonium salt, a quaternary phosphonium salt, an aromatic heterocyclic quaternary ammonium salt, a tertiary amine, or a dihydropyridine derivative. The first vulcanization may, preferably, be a quaternary ammonium salt or a quaternary phosphonium. The quaternary ammonium salts and quaternary phosphonium salts may have the general formula selected from the group consisting of

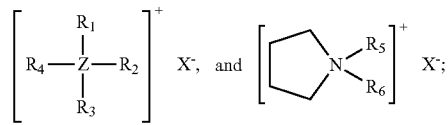

wherein Z is either a nitrogen atom or a phosphorous atom, each of $R_{1-4}$ is independently an alkyl or aryl group containing between 2 and 8 carbon atoms and wherein the total number of carbon atoms on $R_{14}$ is between 10 and 14 carbons, $R_5$ and $R_6$ are alkyl groups containing between 1 and 8 carbon atoms and the total number of carbon atoms on $R_5$-$R_6$ is between 5 and 9. Aryl groups may, for example, be benzyl or phenyl. The anion, $X^-$, of the onium salt may include, but is not limited to, chloride, bromide, hydrogen sulfate, acetate, fluoride, dihydrogen phosphate, and other anions which form stable quaternary ammonium or phosphonium salts. Aromatic heterocyclic quaternary ammonium and phosphonium salts wherein the nitrogen or phosphorous atom is part of the ring are not considered accelerators for use in the compositions of the instant invention. Exemplary quaternary ammonium compounds include, but are not limited to, tetrapropylammonium bromide, and triethylhexylammonium bromide.

The cure system may include any amounts of the first vulcanization accelerator; for example, the cure system may include from about 0.1 to 1.0 parts of the first vulcanization accelerator per 100 parts of the halogenated elastomer composition to be cured. All individual values and subranges from 0.1 to 1.0 parts of the first vulcanization accelerator per 100 parts of the halogenated elastomer composition to be cured are included herein and disclosed herein. For example, the cure system may include from about 0.1 to 0.75 parts of the first vulcanization accelerator per 100 parts of the halogenated elastomer composition to be cured; or in the alternative, the cure system may include from about 0.1 to 0.3 parts of the first vulcanization accelerator per 100 parts of the halogenated elastomer composition to be cured.

Second vulcanization accelerator may be any accelerator; for example, second vulcanization accelerator may be a quaternary ammonium salt, a quaternary phosphonium salt, an aromatic heterocyclic quaternary ammonium salt, a tertiary amine, or a dihydropyridine derivative. The second vulcanization accelerator may preferably be an aromatic heterocyclic quaternary ammonium salt. The aromatic heterocyclic quaternary ammonium salts may have the general formula selected from the group consisting of

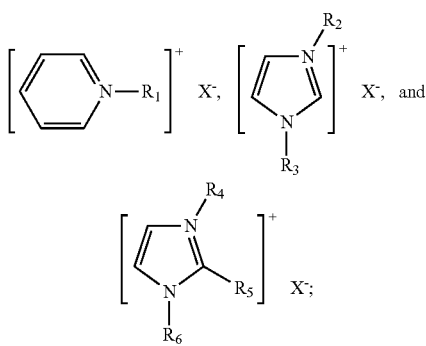

wherein $R_1$ is an alkyl or aryl group containing between 4 and 12 carbon atoms; $R_2$ and $R_3$ are independently alkyl or aryl groups containing between 1 and 8 carbon atoms, and wherein the total number of carbon atoms on $R_2$ and $R_3$ is between 3 and 9; $R_4$, $R_5$ are methyl groups; $R_6$ is an alkyl group containing between 2 and 8 carbon atoms; and wherein X is an anion. $R_2$ may, for example, be a methyl group. Aryl groups may, for example, be benzyl or phenyl. The anion, $X^-$, of the quaternary ammonium salt may include, but is not limited to, chloride, bromide, hydrogen sulfate, acetate, fluoride, dihydrogen phosphate, and other anions, which form stable quaternary ammonium or phosphonium salts. The exemplary aromatic heterocyclic quaternary ammonium salts include, but are not limited to, 1-octylpyridinium chloride, 1-octylpyridinium bromide, 1-butyl-3-methylimidazolinium chloride, 1-hexyl-3-methylimidazolinium chloride, and 1-hexyl-2,3-dimethylimidazolinium chloride. The cure system may include any amounts of the second vulcanization accelerator; for example, the cure system may include from about 0.1 to 1.0 parts of the second vulcanization accelerator per 100 parts of the halogenated elastomer composition to be cured. All individual values and subranges from 0.1 to 1.0 parts of the second vulcanization accelerator per 100 parts of the halogenated elastomer composition to be cured are included herein and disclosed herein. For example, the cure system may include from about 0.1 to 0.75 parts of the second vulcanization accelerator per 100 parts of the halogenated elastomer composition to be cured; or in the alternative, the cure system may include from about 0.1 to 0.3 parts of the second vulcanization accelerator per 100 parts of the halogenated elastomer composition to be cured.

The chelating agent may, for example, be a nitrogen containing chelating compound. Nitrogen containing chelating compounds include, but are not limited to, bidentate nitrogen compounds, tridentate nitrogen compounds, tetradendate nitrogen compounds, and polydentate nitrogen compounds. Each chelating compound contains two or more nitrogen atoms that are oriented in a configuration capable of forming a coordination complex in association with a charged or polarizable metal atom or other charged or polarizable moiety. Such compounds do not contain only two nitrogen atoms at para positions, relative to one another, on one or more aromatic rings. The cure system may include any amounts of the chelating agent; for example, the cure system may include from 0.2 to 2 parts of the chelating agent per 100 parts of the halogenated elastomer composition to be cured. All individual values and subranges from 0.2 to 2 parts of chelating agent per 100 parts of the halogenated elastomer composition to be cured are included herein and disclosed herein. For example, the cure system may include from about 0.5 to 1.5 parts of chelating agent per 100 parts of the halogenated elastomer composition to be cured.

Bidentate nitrogen compounds include, but are not limited to, ethylenediamine, 2,2'-bipyridine, 1,10-phenanthroline, and derivatives thereof. Such derivatives, as the term is used herein, are compounds based on the structure of the respective parent compound. Representative structures are shown below.

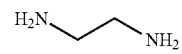
Ethylenediamine

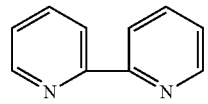
2,2'-Bipyridine

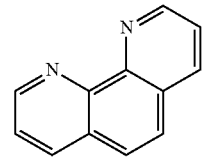
1,10-Phenanthroline

Tridentate nitrogen containing compounds, include, but are not limited to, a terpyridine, diethylenetriamine, and derivatives thereof. Representative structures are shown below.

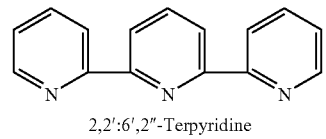
2,2':6',2''-Terpyridine

-continued

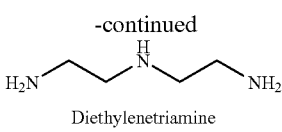
Diethylenetriamine

Tetradentate nitrogen containing compounds include, but are not limited to, triethylenetetramine, porphyrin, phthalocyanine, and derivatives thereof. Representative structures are shown below.

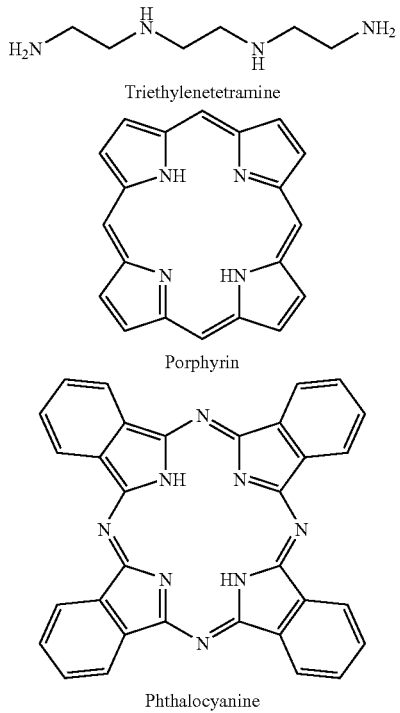

Polydentate nitrogen containing compounds include, but are not limited to, aziridine homopolymers (or polyethyleneimines), aziridine/1,2-diaminoethane copolymers, polymeric condensation product of ammonia and 1,2-dichloroethane, or derivatives thereof. Representative polyethyleneimines (PEIs) are polymeric amines with the general backbone unit, —(CH$_2$—CH$_2$—NH)$_n$—, where "n" is from 10 to $10^5$. Polyethyleneimines may also include branched and/or spherical polyamines. In general, these structures usually have a well-defined ratio of primary, secondary, and tertiary amine functions. An example of a portion of a representative polyethyleneimine is shown below.

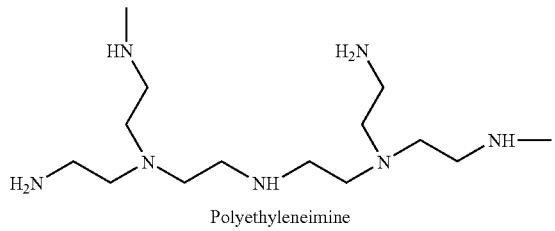
Polyethyleneimine

In one embodiment, the nitrogen containing chelating compounds preferably do not contain any heteroatoms, other than nitrogen and oxygen, and more preferably contain only hydrogen, carbon, and nitrogen. In another embodiment, the nitrogen containing chelating compound contains an N—C—C—N bonding sequence in the structure of the compound. In a further embodiment, the N—C—C—N bonding sequence is selected from the structures shown below:

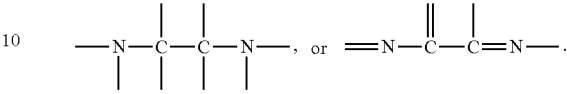

The nitrogen containing chelating compound must be soluble or finely dispersible in the polymer phase of the compound in order to be an effective component of the invention. Furthermore, it is preferable that the nitrogen containing chelating agent have a boiling point that exceeds the temperature at which the elastomer compound is cured, so that occupational exposure to the chelating agent and bubble formation in the finished elastomer product are minimized.

Some nitrogen containing chelating compounds, such as ethylenediamine-tetraacetic acid (EDTA) and it salts, are not soluble or dispersible in many elastomer compounds, and therefore are not effective. Nitrogen containing chelating agents may preferably be 1,10-phenanthroline and its derivatives.

The cure system including a polymercapto crosslinking agent, an inorganic base, and a hydrated salt may be produced in batches, and then mixed with the chlorinated elastomer composition to be cured; or in the alternative, the curable halogenated elastomer composition may be produced continuously via mixing the chlorinated elastomer composition with a polymercapto crosslinking agent, an inorganic base, and a hydrated salt.

The curable compositions of the instant invention have a combination of good process safety (low scorch), relatively fast and reproducible cure rates and good bin stability. Typically, a scorch rate of less than 0.35 Mooney units (MU) per minute is considered safe. A cure rate of at least 3 in-lb/minute (3.4 dN·m/minute) is considered acceptable. The ratio of cure rate to scorch rate is a convenient parameter that may be employed to describe a cure system. For most processes, a ratio of at least 13 in-lb/MU (14.7 dN·m/MU) is acceptable. A bin stability of less than 0.2 Mooney unit (MU) rise/hour is considered acceptable. Preferably, scorch rate is less than 0.21 MU/minute and bin stability is less than 0.1 MU rise/hour.

Typical end use applications for the curable compositions of this invention include articles such as automotive and industrial hoses, wire and cable jackets, vibration isolators, flexible boots for mechanical joints, roller covers, seals, and gaskets.

In production, the ingredients of the curable chlorinated elastomer composition are typically mixed and uniformly blended with the chlorinated elastomeric polymer by use of a high intensity internal mixer such as a Banbury®, Farrel Corporation, mixer. They may also be incorporated by milling on a two-roll mill or by any other mechanical mixing device from which a uniform blend of the ingredients can be derived. It is preferable to mix the ingredients of the elastomeric composition such that the temperature of the composition does not exceed about 110° C. and the time of the mixing is maintained as short as is necessary to achieve a uniform composition.

The mixing process may be improved by adding some of the ingredients in a binder. For example, reaction accelerators can be bound in a polymer such as ethylene-propylene-diene rubber at concentrations of 25-75 percent of the accelerator; thus, making addition of small amounts of ingredient easier to handle. Whether the ingredients are added neat or in binders does not materially affect the results of this invention.

The conditions under which the elastomeric compound is crosslinked into the elastomeric product range from temperatures of from 120° C. to 200° C., preferably from 140° C. to 180° C., and from atmospheric pressure to high pressures, such as those encountered in compression or injection molding. The time for the crosslinking reaction to take place varies with the temperature and the concentrations of polymercapto compound, accelerator, and metal oxide in the composition. Lower temperatures and lower concentrations require longer times for the finished part to be crosslinked. Typical crosslinking times may, for example, take 1 minute to several hours.

The method of producing a curable chlorinated composition, according to instant invention, includes the following steps: (1) providing a chlorinated elastomer composition; (2) providing a cure system composition including a polymercapto crosslinking agent, an inorganic base, and a hydrated salt selected from the group consisting of lithium citrate, trilithium citrate pentahydrate, trilithium citrate tetrahydrate, and monolithium dihydrogen citrate monohydrate; (3) uniformly blending the cure system into the chlorinated elastomer composition; and (4) thereby forming a curable chlorinated elastomer composition.

The method of curing a chlorinated elastomer composition, according to instant invention, includes the following steps: (1) providing a chlorinated elastomer composition; (2) providing a cure system composition including a polymercapto crosslinking agent, an inorganic base, and a hydrated salt selected from the group consisting of lithium citrate, trilithium citrate pentahydrate, trilithium citrate tetrahydrate, and monolithium dihydrogen citrate monohydrate; (3) uniformly blending the cure system into the chlorinated elastomer composition; (4) thereby forming a curable chlorinated elastomer composition; (5) subjecting the curable chlorinated elastomer composition to heat or heat and pressure; and (6) thereby curing the curable chlorinated elastomer composition.

The present invention may be embodied in other forms without departing from the spirit and the essential attributes thereof, and, accordingly, reference should be made to the appended claims, rather than to the foregoing specification, as indicating the scope of the invention.

EXAMPLES

The following examples illustrate the present invention, but are not intended to limit the scope thereof. The examples of the instant invention demonstrate improved cure rates for chlorinated polyethylene while maintaining stability at storage and processing temperatures thereof.

Inventive Examples 1-21 were prepared according to instant invention. The ingredients and the formulation of the Inventive Examples 1-21 are shown in Tables 1, 3, 5, 7, 9, 12, and 14. Compounds were mixed in a Banbury®, Farrel Corporation, BR style mixer using an upside down mixing procedure. In the upside down procedure, the dry ingredients were charged to the mixer first, followed by the liquid ingredients, and then the polymer. A slow mixing speed was used. The chute was swept down after fluxing, and the mixture was dumped from the mixer at approximately 105° C. The discharged compound was further processed via a two-roll mill to ensure full dispersion via a cigar-rolling technique in which the blanket was rolled as it came off the mill, and then reinserted through the rolls in a lengthwise direction. This large blanket was removed from the mill, and a portion was cut off and reworked on the mill. The thickness of the reworked blanket was approximately 0.125 inches. The blanket was used to produce compression-molded slabs, and provided uncured sample strips. Uncured compounds were aged in a Temperature/Humidity Chamber from Associated Environmental Systems (Ayers, Mass.) Model LH-6. The conditions in the humidity chamber were chosen to simulate accelerated aging under warehousing or shipping conditions (90 percent RH/43° C.). Samples were further crosslinked into the elastomeric products under the following conditions: temperature range of 160° C. to 180° C., pressure range of atmospheric pressure to high pressures, such as those encountered in compression or injection molding, and a time period range of 2 minutes to 50 minutes. The Inventive Examples 1-21 were tested for their properties, and the results are shown in Tables 2, 4, 6, 8, 10, 11, 13, and 15. Comparative Examples A-M, and Control Examples 1-3 were prepared under the same conditions as the Inventive Examples 1-21, and their ingredients and formulation are shown in Tables 1, 3, 5, 7, 9, 12, and 14. Comparative Examples A-M, and Control Examples 1-3 were tested for their properties, and the results are shown in Tables 2, 4, 6, 8, 10, 11, 13, and 15.

Test Methods

Test methods include the following:
Tear strength was measured according to ASTM-D624.
Abrasion resistance was measured according to ISO 4649.
Rebound resilience according to ASTM-D1054, using a digi test resilience elasticity tester.
Physical properties were measured according to ASTM D412.
Hardness was measured according to ASTM D2240.
Cure rate testing was measured according to ASTM D2084 on a Monsanto Oscillating Disk Rheometer (ODR) at 177° C. for 30 minutes, and according to ASTM D5289 on a Moving Die Rheometer (MDR) @ 177° C. for 30 minutes. Evaluation for processing safety was measured according to ASTM D1646 on a Monsanto MV2000E using changes in the Mooney viscosity over the course of a 25 minute test at 121° C. For the ODR testing, ML and MH refer to the minimum and maximum torques measured during the test. The t2, t50, and t90 parameters are the time for the torque to change 2 percent, 50 percent, and 90 percent of the difference between MH and ML. The maximum cure rate was obtained directly from the slope of the ODR curve by calculating the slope of the curve from point to point and taking the maximum value of the slope.

For the Mooney Scorch test used to estimate processing safety, Mooney Minimum refers to the minimum viscosity observed during the test. The parameters t3, t5, and t10 refer to the time for the Mooney Viscosity to rise by 3, 5, and 10 units respectively. A scorch rate can be calculated by dividing 2 by the difference between t5 and t3. However, if the Mooney viscosity fails to change more than 3-5 units during the test, a scorch rate can be calculated by Equation 1.

$$\text{Scorch Rate} = \frac{(\text{Mooney Viscosity @ 25 min} - \text{Mooney Minimum})}{(25 \text{ min} - \text{time @ Mooney Minimum})} \quad \text{Eq. 1}$$

A measure of the bin stability, (that is the safety of the compound to changes in viscosity during storage of the compound) was measured by examining the difference between the Mooney minimum viscosity after storage for one week (168 hours) at 43° C. and 90 percent relative humidity versus the original Mooney minimum viscosity measured directly after the compound was made. Equation 2 shows the relevant measure of the rate of change in the Mooney viscosity during storage (increase in Mooney units "MU" per hour).

$$\text{Bin Rate } (MU/\text{hour}) = \frac{MU(\text{aged}) - MU(\text{original})}{168 \text{ hours}} \quad \text{Eq. 2}$$

TABLE 1

| Ingredients (phr) | Control 1 | Example 1 | Comparative A | Comparative B | Comparative C |
|---|---|---|---|---|---|
| TYRIN CM 0836 | 100 | 100 | 100 | 100 | 100 |
| N-774 Carbon Black | 50 | 50 | 50 | 50 | 50 |
| Magnesium hydroxide | 5 | 5 | 5 | 5 | 5 |
| Aromatic oil (Sundex ™ 790T) | 30 | 30 | 30 | 30 | 30 |
| Echo(tm) A MB 4842-75% | 2.67 | 2.67 | 2.67 | 2.67 | 2.67 |
| Tetrapropyl ammonium bromide (TPAB) | 0.3 | 0.3 | 0.3 | 0.3 | 0.3 |
| Lithium citrate hydrate | — | 2 | — | — | — |
| Magnesium thiosulfate hydrate | — | — | 2 | — | — |
| Sodium sulfate decahydrate | — | — | — | 2 | — |
| Magnesium sulfate heptahydrate | — | — | — | — | 2 |
| Total phr | 187.97 | 189.97 | 189.97 | 189.97 | 189.97 |

Recipe for Inventive Example 1, Control 1, and Comparative A-B

TABLE 2

|  | Control 1 | Example 1 | Comparative A | Comparative B | Comparative C |
|---|---|---|---|---|---|
| Mooney Scorch Rate (SR), (MU/min) | 0.216 | 0.255 | 0.214 | 0.260 | 0.245 |
| ODR Cure Rate (max), (in-lb/min) | 7.3 | 16.2 | 8.3 | 12.7 | 10.8 |
| Change in MSR relative to Control, (%) | — | 18.1 | −0.9 | 20.4 | 13.6 |
| Change in ODR Cure Rate relative Control, (%) | — | 120.7 | 13.6 | 73.3 | 46.7 |
| Cure Rate/Scorch Rate, (in-lb/MU) | 34.0 | 63.5 | 39.0 | 48.9 | 43.8 |
| Bin Rate, (MU/60 min) | 0.095 | 0.133 | 0.117 | 0.165 | 0.121 |
| Cure Rate/Bin Rate (60 in-lb/MU) | 77.0 | 121.9 | 71.4 | 77.0 | 89.0 |

Test results for properties tested for Inventive Example 1, Control 1, and Comparative A-B

TABLE 3

| Ingredient | Control 2 | Example 2 | Example 3 | Example 4 |
|---|---|---|---|---|
|  |  | phr |  |  |
| TYRIN CM 0836 | 100 | 100 | 100 | 100 |
| N-774 Carbon Black | 50 | 50 | 50 | 50 |
| Magnesium hydroxide | 5 | 5 | 5 | 5 |
| Aromatic oil (Sundex ™ 790T) | 30 | 30 | 30 | 30 |
| Echo(tm) A MB 4842-75% | 2.67 | 2.67 | 2.67 | 2.67 |
| Tetrapropyl ammonium bromide (TPAB) | 0.3 | 0.3 | 0.3 | 0.3 |
| Lithium citrate hydrate | — | 0.5 | 1 | 2 |
| Total phr | 187.97 | 189.97 | 189.97 | 189.97 |

Recipe for Inventive Examples 2-4, and Control 2

TABLE 4

|  | Control 2 | Example 2 | Example 3 | Example 4 |
|---|---|---|---|---|
| Mooney Scorch Rate, MU/min | 0.278 | 0.282 | 0.263 | 0.300 |
| ODR Cure Rate (max), in-lb/min | 6.25 | 6.92 | 10.50 | 15.50 |
| Cure Rate/Scorch Rate, in-lb/MU | 22.5 | 24.5 | 39.9 | 51.7 |
| Bin Rate, MU/hr | 0.070 | 0.093 | 0.113 | 0.113 |
| Cure Rate/Bin Rate 60 in-lb/MU | 89.0 | 74.0 | 92.8 | 137.8 |

Test results for properties tested for Inventive Examples 2-4, and Control 2

TABLE 5

| Ingredient | Control 3 | Example 5 | Example 6 | Example 7 | Example 8 |
|---|---|---|---|---|---|
|  |  |  | phr |  |  |
| TYRIN CM 0836 | 100 | 100 | 100 | 100 | 100 |
| N-774 Carbon Black | 50 | 50 | 50 | 50 | 50 |
| Magnesium hydroxide | 5 | 5 | 5 | 5 | 5 |
| Aromatic oil (Sundex ™ 790T) | 30 | 30 | 30 | 30 | 30 |
| Echo(tm) A MB 4842-75% | 2.67 | 2.67 | 2.67 | 2.67 | 2.67 |
| Tetrapropyl ammonium bromide (TPAB) | 0.3 | 0.3 | 0.3 | 0.3 | 0.3 |

TABLE 5-continued

| Ingredient | Control 3 | Example 5 | Example 6 phr | Example 7 | Example 8 |
|---|---|---|---|---|---|
| Lithium citrate hydrate | — | 1 | 2 | 3.5 | 5 |
| Magnesium thiosulfate hydrate | — | — | — | — | — |
| Sodium sulfate decahydrate | — | — | — | — | — |
| Magnesium sulfate heptahydrate | — | — | — | — | — |
| Total phr | 187.97 | 189.97 | 189.97 | 189.97 | 189.97 |

Recipe for Inventive Examples 5-8, and Control 3

TABLE 6

| | Control 3 | Example 5 | Example 6 | Example 7 | Example 8 |
|---|---|---|---|---|---|
| Mooney Scorch Minimum, (MU) | 36.5 | 34.7 | 34.8 | 34.2 | 33.0 |
| Mooney Scorch t3, (minutes) | 12.4 | 15.0 | 12.4 | 9.7 | 6.7 |
| ODR t90 Cure Time, (minutes) | 12.7 | 11.6 | 7.1 | 5.1 | 4.66 |
| ODR Delta Torque, (in-lb) | 34.6 | 34.8 | 37.3 | 38.4 | 37.8 |

Test results for properties tested for Inventive Examples 5-8, and Control 3

TABLE 7

| Ingredient | Comparative D | Comparative E | Comparative F | Comparative G phr | Example 9 | Example 10 | Example 11 | Example 12 |
|---|---|---|---|---|---|---|---|---|
| TYRIN CM 0836 | 100 | 100 | 100 | 100 | 100 | 100 | 100 | 100 |
| N-774 Carbon Black | 50 | 50 | 50 | 50 | 50 | 50 | 50 | 50 |
| Magnesium hydroxide | 5 | 5 | 5 | 5 | 5 | 5 | 5 | 5 |
| Sundex ™ 790T | 30 | 30 | 30 | 30 | 30 | 30 | 30 | 30 |
| Echo ™ A MB 4842-75% | 2.67 | 2.67 | 2.67 | 2.67 | 2.67 | 2.67 | 2.67 | 2.67 |
| Tetrapropylammonium bromide (TPAB) | 0.4 | | | | 0.4 | | | |
| 3,5-diethyl-1,2-dihydro-1-phenyl-2-propylpyridine (Vanax ® 808 HP) | | 0.24 | | | | 0.24 | | |
| n-octylpyridinium chloride | | | 0.24 | | | | 0.24 | |
| 1-hexyl-2,3-dimethylimidazolinium chloride | | | | 0.24 | | | | 0.24 |
| Lithium citrate hydrate | | | | | 2 | 2 | 2 | 2 |
| Total phr: | 188.07 | 187.91 | 187.91 | 187.91 | 190.07 | 189.91 | 189.91 | 189.91 |

Recipe for Inventive Examples 9-12, and Comparative Examples D-G

TABLE 8

| | Units | Comparative D | Comparative E | Comparative F | Comparative G | Example 9 | Example 10 | Example 11 | Example 12 |
|---|---|---|---|---|---|---|---|---|---|
| Mooney Scorch | | | | | | | | | |
| Test temp | [° C.] | 121 | 121 | 121 | 121 | 121 | 121 | 121 | 121 |
| Test time | [M · m] | 30 | 30 | 30 | 30 | 30 | 30 | 30 | 30 |
| Mm (min) | [MU] | 37 | 37.3 | 35 | 37.2 | 36.6 | 36.2 | 35.1 | 35.5 |
| Mooney Scorch Rate | [MU/min] | 0.377 | 0.432 | 0.175 | 0.208 | 0.291 | 0.323 | 0.174 | 0.159 |
| Change in Mooney Scorch Rate vs. Control | [%] | — | — | — | — | −22.8 | −25.2 | −0.8 | −23.9 |
| t3 | [M · m] | 11.51 | 9.58 | 19.35 | 14.45 | 12.45 | 12.36 | 21.15 | 22.42 |
| t5 | [M · m] | 16.98 | 13.33 | >30 | 26.2 | 18.97 | 18.34 | >30 | >30 |
| Oscillating Disc Rheometer (ODR) | | | | | | | | | |
| Test temp | [° C.] | 177 | 177 | 177 | 177 | 177 | 177 | 177 | 177 |
| Test time | [M · m] | 30 | 30 | 30 | 30 | 30 | 30 | 30 | 30 |
| ML (min) | [in-lb] | 14.52 | 14.35 | 13.38 | 14.32 | 14.3 | 13.95 | 12.52 | 12.7 |
| MH (max) | [in-lb] | 49.87 | 58.18 | 53.53 | 53.81 | 52.9 | 58.68 | 55.78 | 52.68 |
| ts1 | [M · m] | 1.21 | 1.2 | 1.67 | 1.42 | 1.19 | 1.2 | 1.96 | 1.79 |
| ts2 | [M · m] | 1.41 | 1.41 | 2.01 | 1.69 | 1.38 | 1.37 | 2.43 | 2.16 |
| t2 | [M · m] | 1.14 | 1.18 | 1.59 | 1.35 | 1.14 | 1.17 | 1.88 | 1.69 |
| t50 | [M · m] | 3.25 | 3.98 | 5.54 | 4.35 | 2.52 | 2.48 | 5 | 4.01 |
| t90 | [M · m] | 8.91 | 9.98 | 13.42 | 11.32 | 4.88 | 5.14 | 9.08 | 8.55 |
| MAX-MIN | [in-lb] | 35.35 | 43.83 | 40.15 | 39.49 | 38.6 | 44.73 | 43.26 | 39.98 |
| Max Cure Rate | [in-lb/m] | 9.9 | 8.8 | 5.9 | 7.8 | 22.4 | 29.0 | 13.0 | 15.0 |
| Change in Max Cure Rate vs. | [%] | — | — | — | — | 127 | 228 | 121 | 92 |

TABLE 8-continued

| | Units | Comparative D | Comparative E | Comparative F | Comparative G | Example 9 | Example 10 | Example 11 | Example 12 |
|---|---|---|---|---|---|---|---|---|---|
| Control Change in t90 Cure Time vs. Control | [%] | — | — | — | — | −45.2 | −48.5 | −32.3 | −24.5 |

Test results for properties tested for Inventive Examples 9-12, and Comparative Examples D-G

TABLE 9

| Ingredient | Comparative H | Example 13 | Comparative I phr | Example 14 | Comparative J | Example 15 |
|---|---|---|---|---|---|---|
| TYRIN CM 0836 | 100 | 100 | 100 | 100 | 100 | 100 |
| N-774 Carbon Black | 50 | 50 | 50 | 50 | 50 | 50 |
| Magnesium oxide | 5 | 5 | 5 | 5 | 5 | 5 |
| Aromatic Oil (Sundex ™ 790T) | 30 | 30 | 30 | 30 | 30 | 30 |
| Echo ™ A MB 4842-75% | 2.67 | 2.67 | 2.67 | 2.67 | 2.67 | 2.67 |
| Vanax ® 808 HP | 0.24 | 0.24 | | | 0.12 | 0.12 |
| 1-hexyl-2,3-dimethylimidazolinium chloride | | | 0.24 | 0.24 | | |
| Polyethylenimine (PEI) | | 0.75 | | 0.75 | | 0.75 |
| Lithium citrate hydrate | | 1.75 | | 1.75 | | 1.75 |
| Total phr lab | 187.91 | 190.41 | 187.91 | 190.41 | 187.79 | 190.29 |

Recipe for Inventive Examples 13-15, and Comparative Examples H-J

TABLE 10

| | | Comparative H | Example 13 | Comparative I | Example 14 | Comparative J | Example 15 |
|---|---|---|---|---|---|---|---|
| MDR (Moving Die Rheometer)/177° C./30 minutes | | | | | | | |
| t90 with no zinc contamination | [min] | 6.98 | 3.31 | 7.87 | 6.11 | 11.75 | 5.94 |
| t90 with 300 ppm zinc contamination | [min] | 19.32 | 3.63 | 25.39 | 9.21 | 24.72 | 6.29 |
| Increase in t90 due to 300 ppm zinc contamination | [%] | 176.8 | 9.7 | 222.6 | 50.7 | 110.4 | 5.9 |
| Max MDR Cure Rate (no zinc) | [dNm/min] | 4.83 | 4.87 | 3.04 | 2.79 | 2.26 | 2.31 |
| Max MDR Cure Rate with 300 ppm zinc | [dNm/min] | 0.99 | 4.58 | 0.33 | 2.59 | 0.44 | 2.23 |
| Change in Max MDR Cure Rate due to 300 ppm zinc contamination | [%] | −79.5 | −6.0 | −89.1 | −7.2 | −80.5 | −3.5 |

Test results for properties tested for Inventive Examples 13-15, and Comparative Examples H-J

TABLE 11

| | Unit | Comparative H | Example 13 | Comparative I | Example 14 | Comparative J | Example 15 |
|---|---|---|---|---|---|---|---|
| Mooney Scorch | | | | | | | |
| Test temp | [° C.] | 121 | 121 | 121 | 121 | 121 | 121 |
| Test time | [M · m] | 26 | 26 | 26 | 26 | 26 | 26 |
| Preheat | [M · m] | 1 | 1 | 1 | 1 | 1 | 1 |
| Rotor Size | | Small | Small | Small | Small | Small | Small |
| Mooney Scorch Rate (MSR) | [MU/min] | 0.170 | 0.464 | 0.132 | 0.278 | 0.147 | 0.226 |
| Change in MSR vs. Controls | [%] | | 172.1 | | 110.2 | | 53.7 |
| Mooney Scorch Samples Aged 90% Relative Humidity/7 days/43° C. | | | | | | | |

TABLE 11-continued

|  | Unit | Comparative H | Example 13 | Comparative I | Example 14 | Comparative J | Example 15 |
|---|---|---|---|---|---|---|---|
| Test temp | [° C.] | 121 | 121 | 121 | 121 | 121 | 121 |
| Test time | [M · m] | 26 | 26 | 26 | 26 | 26 | 26 |
| Preheat | [M · m] | 1 | 1 | 1 | 1 | 1 | 1 |
| Rotor Size |  | Small | Small | Small | Small | Small | Small |
| Minimum viscosity | [MU] | 67.2 | 73.5 | 51.7 | 56 | 56.8 | 55.9 |
| Change in Minimum viscosity | [MU] | 31.4 | 27.7 | 15.8 | 12.4 | 20.1 | 12 |
| Original Physical Properties |  |  |  |  |  |  |  |
| 100% Modulus | [MPa] | 4.3 | 4.8 | 4.0 | 4.3 | 4.4 | 4.2 |
| 200% Modulus | [MPa] | 8.5 | 9.2 | 7.3 | 8.3 | 8.7 | 7.9 |
| 300% Modulus | [MPa] | 12.0 | 12.6 | 10.2 | 11.5 | 12.2 | 11.0 |
| Tensile Strength | [MPa] | 15.6 | 16.5 | 16.0 | 16.4 | 16.2 | 16.3 |
| Elongation | [%] | 433 | 415 | 513 | 476 | 452 | 479 |
| Hardness | [Shore A] | 73 | 72 | 72 | 72 | 73 | 71 |
| Air Oven Aging/7.0 days/ 121° C. |  |  |  |  |  |  |  |
| Tensile | [% Retention] | 95.9 | 100.8 | 91.3 | 94.1 | 97.5 | 101.6 |
| Elongation | [% Retention] | 86.6 | 91.3 | 80.1 | 82.4 | 90.7 | 89.6 |
| Hardness | [Shore A] | 78 | 77 | 78 | 78 | 78 | 76 |
| Hardness Increase | [points] | 5 | 5 | 6 | 6 | 5 | 5 |
| Test Temperature | [C.] | 23 | 23 | 23 | 23 | 23 | 23 |
| Mooney Scorch Rate | [MU/min] | 0.170 | 0.464 | 0.132 | 0.278 | 0.147 | 0.226 |
| MDR Cure Rate | [dN-m/min] | 4.83 | 4.87 | 3.04 | 2.79 | 2.26 | 2.31 |
| CR/SR | [dN-m/MU] | 28 | 11 | 23 | 10 | 15 | 10 |

Further test results for properties tested for Inventive Examples 13-15, and Comparative Examples H-J

TABLE 12

| Ingredient | Comparative K | Example 16 | Comparative L | Example 17 |
|---|---|---|---|---|
| TYRIN CM 0836 | 100 phr | 100 phr | 100 phr | 100 phr |
| N-774 Carbon Black | 50 phr | 50 phr | 50 phr | 50 phr |
| StanMag HydroxideB | 5 phr | 5 phr | 5 phr | 5 phr |
| SUNDEX 790T | 30 phr | 30 phr | 30 phr | 30 phr |
| Echo A MB 4842-75% | 2.67 phr | 2.67 phr | 2.67 phr | 2.67 phr |
| TetrapropylAB | 0.4 phr | 0.4 phr | 0.4 phr | 0.4 phr |
| Li Citrate Hydrate | — | 2 phr | — | 2 phr |
| PEI | — | 0.75 phr | — | 0.75 phr |
| Zn | — | — | 350 ppm | 350 ppm |
| Total phr: | 188.07 phr | 190.82 phr | 188.07 phr | 190.82 phr |

Recipe for Inventive Examples 16-17, and Comparative Examples K-L

TABLE 13

| ODR | Units | Comparative K | Example 16 | Comparative L | Example 17 |
|---|---|---|---|---|---|
| Test temp | [° C.] | 177 | 177 | 177 | 177 |
| Test time | [M · m] | 30 | 30 | 30 | 30 |
| ML (min) | [dN-m] | 16.41 | 18.01 | 13.30 | 16.61 |
| MH (max) | [dN-m] | 56.35 | 53.13 | 41.76 | 49.90 |
| ts1 | [M · m] | 1.21 | 1.18 | 2.34 | 1.28 |
| ts2 | [M · m] | 1.41 | 1.38 | 3.14 | 1.51 |
| t2 | [M · m] | 1.14 | 1.09 | 1.92 | 1.16 |
| t50 | [M · m] | 3.25 | 2.79 | 13.48 | 3.38 |
| t90 | [M · m] | 8.91 | 4.46 | 25.69 | 6.91 |
| MAX − MIN | [dN-m] | 39.95 | 35.12 | 28.46 | 33.29 |
| Max Cure Rate | [dN-m/min] | 11.15 | 13.18 | 1.46 | 8.57 |

Test results for properties tested for Inventive Examples 16-17, and Comparative Examples K-L

TABLE 14

| Ingredient | Comparative M | Example 18 | Example 19 phr | Example 20 | Example 21 |
|---|---|---|---|---|---|
| TYR CM 9934 | 100 | 100 | 100 | 100 | 100 |
| Magnesium oxide | 5 | 5 | 5 | 5 | 5 |
| Polyethylene wax | 3 | 3 | 3 | 3 | 3 |
| AgeRite ™ Resin D | 0.25 | 0.25 | 0.25 | 0.25 | 0.25 |
| Calcium Carbonate | 80 | 80 | 80 | 80 | 80 |
| N-774 Carbon Black | 50 | 50 | 50 | 50 | 50 |
| Sundex ™ 790TN | 55 | 55 | 55 | 55 | 55 |

TABLE 14-continued

| Ingredient | Comparative M | Example 18 | Example 19 phr | Example 20 | Example 21 |
|---|---|---|---|---|---|
| Echo ™ A MB 4842-75% | 2.67 | 2.67 | 2.67 | 2.67 | 2.67 |
| Vanax ® 808 HP | 0.15 | 0.15 | 0.15 | 0.15 | 0.15 |
| Paraffin Wax | 2 | 2 | 2 | 2 | 2 |
| Polyethyleneimine (PEI) |  | 1.5 |  | 1.5 | 0.75 |
| Li Citrate Hydrate |  |  | 1.5 | 1.5 | 0.75 |
| Total phr: | 298.07 | 299.57 | 299.57 | 301.07 | 299.57 |

Recipe for Inventive Examples 18-21, and Comparative Examples M

TABLE 15

| | Units | Comparative M | Example 18 | Example 19 | Example 20 | Example 21 |
|---|---|---|---|---|---|---|
| Mooney Scorch | | | | | | |
| Test temp | [° C.] | 125 | 125 | 125 | 125 | 125 |
| Test time | [M · m] | 25 | 25 | 25 | 25 | 25 |
| Preheat | [M · m] | 1 | 1 | 1 | 1 | 1 |
| Rotor Size | | Small | Small | Small | Small | Small |
| Mm (min) | [MU] | 27.5 | 30.2 | 25.8 | 29.9 | 24.3 |
| t3 | [M · m] | >25 | >25 | >25 | >25 | >25 |
| t5 | [M · m] | >25 | >25 | >25 | >25 | >25 |
| t10 | [M · m] | >25 | >25 | >25 | >25 | >25 |
| MDR | | | | | | |
| Test temperature | [C.] | 160 | 160 | 160 | 160 | 160 |
| Test time | [min] | 45 | 45 | 45 | 45 | 45 |
| ML | [dNm] | 2.5 | 2.37 | 2.53 | 2.79 | 2.83 |
| MH | [dNm] | 10.14 | 8.39 | 10.7 | 8.8 | 8.94 |
| dS' | [dNm] | 7.64 | 6.02 | 8.17 | 6.01 | 6.11 |
| t10 | [min] | 2.69 | 0.12 | 2.66 | 0.72 | 1.7 |
| t50 | [min] | 10.91 | 4.91 | 10.12 | 5.06 | 8.41 |
| t90 | [min] | 24.61 | 15.97 | 18.98 | 15.27 | 18.44 |
| Change in t90 vs. Control | [%] | — | −35.1 | −22.9 | −38.0 | −25.1 |
| FinalS" | [dNm] | 1.37 | 1.31 | 1.24 | 1.32 | 1.36 |
| t95 | [min] | 30.16 | 19.51 | 23.74 | 18.7 | 22.11 |
| Change in t95 vs. Control | [%] | — | −35.3 | −21.3 | −38.0 | −26.7 |
| Original Physical Properties | | | | | | |
| 25% Modulus | [MPa] | 1.6 | 1.5 | 1.5 | 1.6 | 1.5 |
| 50% Modulus | [MPa] | 2.1 | 2.4 | 2.1 | 2.5 | 2.2 |
| 100% Modulus | [MPa] | 3.0 | 4.1 | 2.8 | 4.0 | 3.4 |
| 200% Modulus | [MPa] | 4.8 | 6.7 | 4.4 | 6.6 | 5.2 |
| 300% Modulus | [MPa] | 6.8 | 8.6 | 6.3 | 8.6 | 7.0 |
| Tensile Strength | [MPa] | 9.9 | 10.5 | 10.9 | 10.7 | 10.4 |
| Elongation | [%] | 442 | 427 | 483 | 414 | 501 |
| Hardness | [Shore A] | 74 | 73 | 73 | 72 | 72 |
| Test Temperature | [C.] | 23 | 23 | 23 | 23 | 23 |

Test results for properties tested for Inventive Examples 16-17, and Comparative Examples K-L

We claim:

1. A cure system composition comprising:
   a polymercapto crosslinking agent;
   an inorganic base; and
   a hydrated salt, said hydrated salt being selected from the group consisting of lithium citrate, trilithium citrate pentahydrate, trilithium citrate tetrahydrate, and monolithium dihydrogen citrate monohydrate.

2. The cure system according to claim 1, wherein said hydrated salt being a trilithium citrate tetrahydrate.

3. The cure system composition according to claim 1, wherein said polymercapto crosslinking agent being a crosslinking agent selected from the group consisting of 2,5-dimercapto-1,3,4-thiadiazole and a derivative thereof, preferably 2-mercapto-1,3,4-thiadiazole-5-thiobenzoate.

4. The cure system according to claim 1, wherein said cure system further comprising a nitrogen containing chelating agent.

5. The cure system according to claim 1, wherein said cure system further comprising a first accelerator, said first accelerator being an ammonium or phosphonium salt, wherein said ammonium or phosphonium salt having a formula selected from the group consisting of

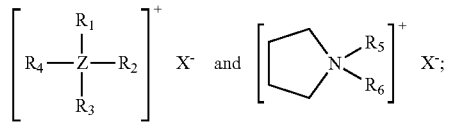

wherein Z is a nitrogen or phosphorous atom, $R_1$ to $R_4$ are independently alkyl or aryl groups containing between 2 and 8 carbon atoms, and the total number of carbon atoms on $R_1$-$R_4$ is between 10 and 14, wherein $R_5$ and $R_6$ are alkyl groups containing between 1 and 8 carbon atoms, and the total number of carbon atoms on $R_5$-$R_6$ being between 5 and 9; and wherein X is an anion.

6. The cure system according to claim 1, wherein said cure system further comprising a second accelerator, said second accelerator being a quaternary ammonium salt having a formula selected from the group consisting of

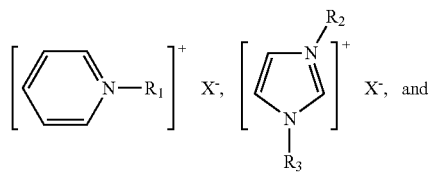

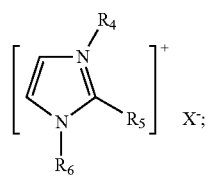

wherein $R_1$ being an alkyl or aryl group containing between 4 and 12 carbon atoms;

wherein $R_2$ and $R_3$ being independently alkyl or aryl groups containing between 1 and 8 carbon atoms;

wherein the total number of carbon atoms on $R_2$ and $R_3$ being between 3 and 9;

wherein $R_4$ and $R_5$ being methyl groups, and $R_6$ being an alkyl group containing between 2 and 8 carbon atoms; and wherein X being an anion.

7. The cure system of claim 1, wherein said cure system further comprising a combination of at least two or more of:

(a) a nitrogen containing chelating agent;

(b) a first accelerator, said first accelerator being an ammonium or phosphonium salt, wherein said ammonium or phosphonium salt having a formula selected from the group consisting of

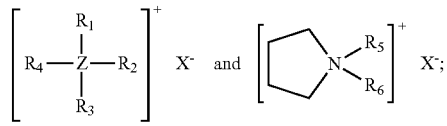

wherein Z is a nitrogen or phosphorous atom, $R_1$ to $R_4$ are independently alkyl or aryl groups containing between 2 and 8 carbon atoms, and the total number of carbon atoms on $R_1$-$R_4$ is between 10 and 14, wherein $R_5$ and $R_6$ are alkyl groups containing between 1 and 8 carbon atoms, and the total number of carbon atoms on $R_5$-$R_6$ being between 5 and 9; and wherein X is an anion; or (c) a second accelerator, said second accelerator being a quaternary ammonium salt having a formula selected from the group consisting of

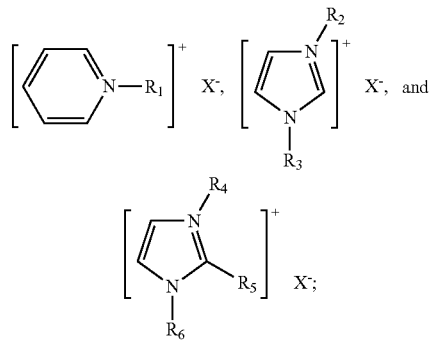

wherein $R_1$ being an alkyl or aryl group containing between 4 and 12 carbon atoms;

wherein $R_2$ and $R_3$ being independently alkyl or aryl groups containing between 1 and 8 carbon atoms;

wherein the total number of carbon atoms on $R_2$ and $R_3$ being between 3 and 9;

wherein $R_4$ and $R_5$ being methyl groups, and $R_6$ being an alkyl group containing between 2 and 8 carbon atoms; and wherein X being an anion.

8. The cure system of claim 7, wherein said nitrogen containing chelating agent is an aromatic heterocyclic base containing a nitrogen bidentate ligand, preferably, 1,10-phenanthroline or 2,2-bipyridyl; a tridentate nitrogen containing compound, selected from the group consisting terpyridine, diethylenetriamine, and derivatives thereof; a tetradentate nitrogen containing compound, selected from the group consisting of triethylenetetramine, porphyrin, phthalocyanine, and derivatives thereof; or a polyamine selected from the group consisting of an aziridine homopolymer, aziridine/1,2-diaminoethane copolymers, and the polymeric condensation product of ammonia and 1,2-dichloroethane.

9. The cure system of claim 7, wherein said first accelerator being selected from the group consisting of tetrapropylammonium bromide, and triethylhexylammonium bromide.

10. The cure system of claim 7, wherein said second accelerator being selected from the group consisting of 1-octylpyridinium chloride, 1-octylpyridinium bromide, 1-butyl-3-methylimidazolinium chloride, 1-hexyl-3-methylimidazolinium chloride, and 1-hexyl-2,3-dimethylimidazolinium chloride.

11. A curable chlorinated elastomer composition comprising:

a chlorinated elastomer; and
a cure system according to claim 1.

12. The curable chlorinated elastomer composition according to claim 11, wherein said chlorinated elastomer being a chlorinated olefin elastomer having a heat of fusion <0.2 calories/gram and having a chlorine content of from 15-48 percent by weight; said chlorinated olefin elastomer being prepared from an olefin polymer selected from the group consisting of i) polyethylene homopolymers having $I_{10}$ values of from 0.05-0.8 dg/minute and ii) copolymers of ethylene and up to 25 weight percent of a copolymerizable monomer, said copolymers having $I_{10}$ values of from 0.05-0.8 dg/minute.

13. The curable chlorinated elastomer composition according to claim 11, wherein said curable chlorinated composition further comprising an additive package.

14. The curable chlorinated elastomer composition according to claim 13, wherein said additive package comprises at least one ingredient selected from the group consisting of i) fillers, said filler preferably being selected from the group consisting of carbon black, talc, mica, silica, clay, calcium carbonate, titanium dioxide, colorants and combinations thereof; ii) plasticizers, said plasticizers preferably being selected from the group consisting of dioctyl phthalate, diisononyl phthalate, dioctyl adipate, trioctyltrimellitate, dioctyl sebacate, diundecyl phthalate, and chlorinated paraffins; iii) process aids, said process aid preferably being selected from the group consisting of paraffin wax and oxidized polyethylene wax; iv) acid acceptors; v) antioxidants; vi) antiozonants; and vii) combinations thereof.

15. The curable chlorinated elastomer composition according to claim 11, wherein said chlorinated elastomer being selected from the group consisting of polychloroprene, polyepichlorohydrin, epichlorohydrin/ethylene oxide copolymers, chlorosulfonated polyethylene, chlorinated polyethylene, and chlorinated butyl rubbers.

16. An article comprising:
at least one curable chlorinated elastomer composition according to claim 11.

* * * * *